K. RUSHTON.
RAILWAY TRUCK.
APPLICATION FILED NOV. 6, 1919.
1,328,592.
Patented Jan. 20, 1920.
2 SHEETS—SHEET 1.
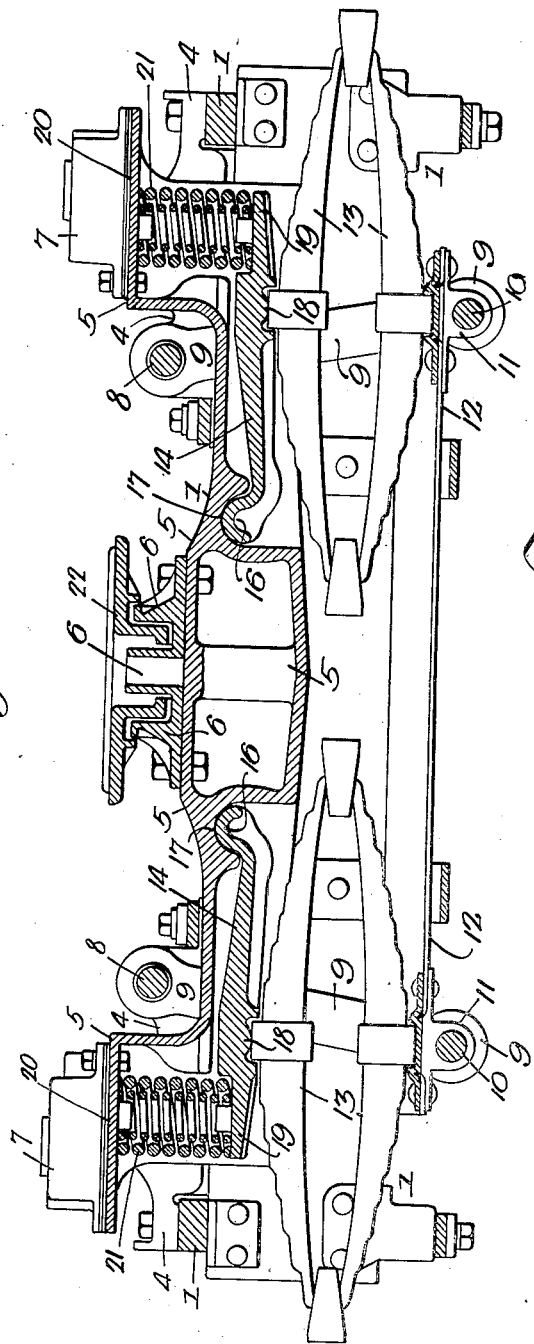
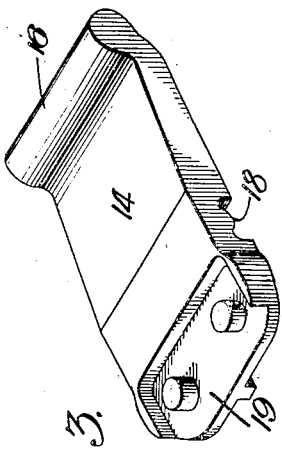
Inventor-
Kenneth Rushton.
by his Attorneys.
Howson & Howson

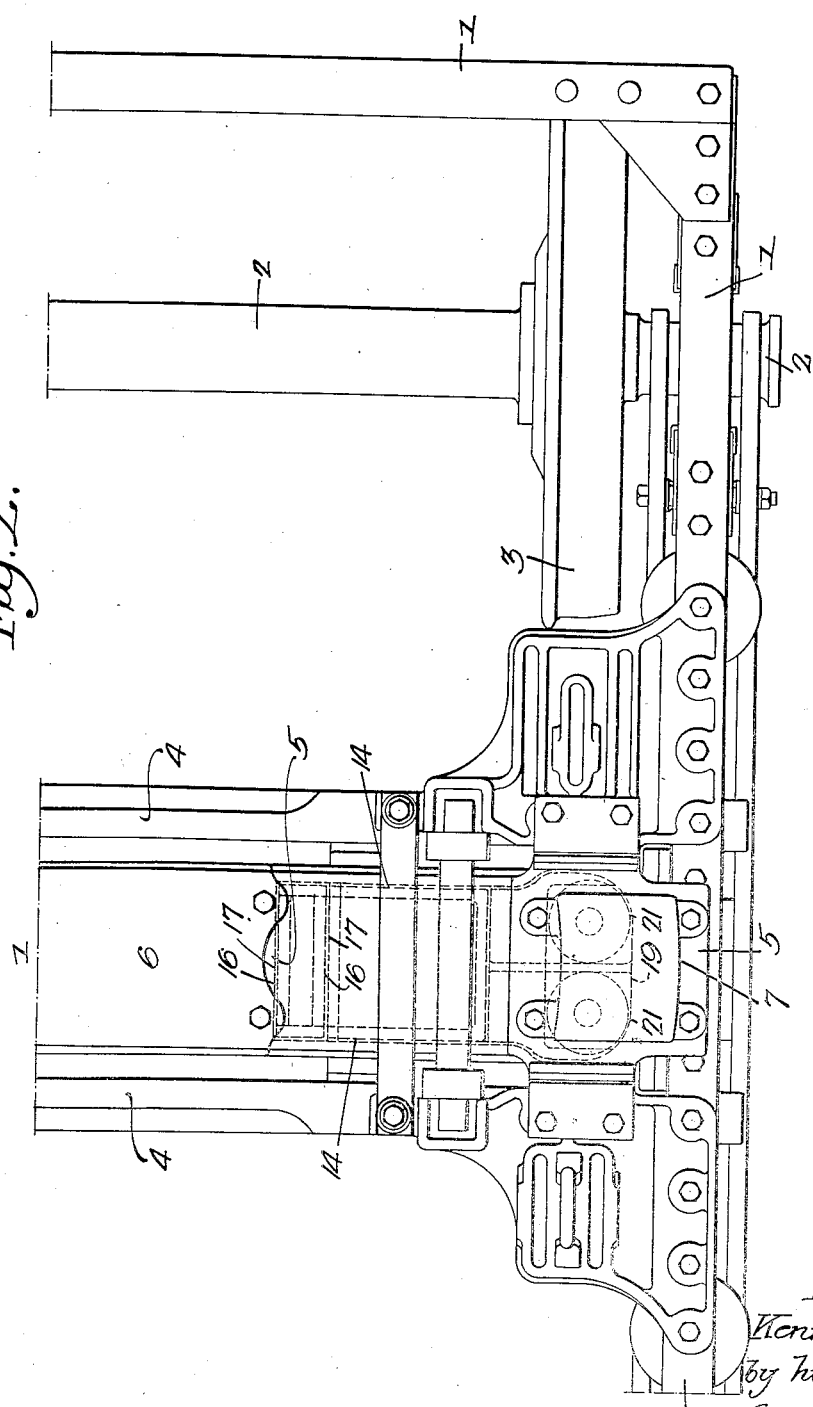

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

RAILWAY-TRUCK.

1,328,592.  Specification of Letters Patent.  Patented Jan. 20, 1920.

Application filed November 6, 1919. Serial No. 335,988.

*To all whom it may concern:*

Be it known that I, KENNETH RUSHTON, a citizen of the United States, residing in Philadelphia, Pennsylvania, have invented certain Improvements in Railway-Trucks, of which the following is a specification.

My invention relates to certain improvements in spring arrangements for railway trucks, particularly those of electric cars.

One object of my invention is to provide a truck having transversely arranged elliptical springs with supplemental springs for carrying light loads.

A further object of the invention is to provide a lever between the two springs at each side of the truck.

Another object of the invention is to design the truck so that the coiled springs can be located between the side bearing plates and the levers beyond the bearings of the levers on the elliptical springs.

In the accompanying drawings:—

Figure 1, is a transverse sectional view of a railway truck illustrating my invention;

Fig. 2, is a plan view of one-half of the truck; and

Fig. 3, is a detached perspective view of one of the levers.

1 is the frame of the ordinary type having boxes for the axles 2 on which the wheels 3 are mounted. 4, 4 are the transoms spaced apart and extending from one side of the truck to the other. 5 is the bolster having a center bearing plate 6 adapted to a bearing 22 and side bearing plates 7. On the transoms 4 are pins 8 from which are suspended the links 9 which carry pins 10 mounted in bearings 11 on the spring plate 12.

13, 13 are two sets of elliptical springs, one set being at one side of the truck and the other at the opposite side. The lower section of each spring is carried by the spring plate 12, while the upper set supports a lever 14. At the inner end of this lever is a round portion 16 adapted to a socket 17 and forms the fulcrum of the lever. The lever has a round portion 18, where it bears upon the spring straps of the elliptical springs, and has an extension 19. Between this extension and the portion 20 of the bolster carrying the side bearing plate 7 are two sets of two coiled springs 21, in the present instance, the inner coil being of lighter material than the outer coil.

It will be noticed that the coiled springs 21 are lighter than the elliptical springs 13 so that, when the car is running light, the light springs 21 carry the load, but when the car is loaded the load is carried mainly by the elliptical springs. A much lighter coiled spring can be used than where the coiled spring is directly above and supported by the elliptical spring. Furthermore, by using the lever a much longer coiled spring can be used and it can be located at the edge of the truck and under the raised side bearing plates, giving more space for the other mechanism of the truck, and the leverage may be increased or diminished, according to the type of truck.

I claim:

1. The combination in a railway truck, of a frame; transoms; links; main springs suspended from the transoms by the links; a bolster; a lever at each side of the truck, each lever having its fulcrum on the bolster and resting upon the upper end of the main spring; and supplemental springs located between the bolster and each lever.

2. The combination in a railway truck, of a frame; transoms spaced apart; a spring plate; links by which the spring plate is suspended; elliptical springs mounted at each end of the spring plate; a bolster; a lever resting on the upper member of each elliptical spring having its fulcrum on the bolster; and a coiled spring mounted between the bolster and the outer end of the lever beyond its bearing on the elliptical spring.

3. The combination in a railway truck, of a frame; transoms extending across the frame and spaced apart; a bolster mounted between the transoms and having a center bearing plate; spring supports; links connecting the spring supports with the transoms; elliptical springs mounted on each spring support; two levers, one at each side of the truck, each lever bearing upon an elliptical spring; an elevated portion at each end of the bolster and beyond the line of the elliptical springs; and coiled springs mounted between the elevated portions and the levers.

4. The combination in a railway truck, of a frame; transoms extending across the frame and spaced apart; a bolster located in the space between the transoms; a spring plate; links suspending the spring plate from the transoms, the bolster having an elevated section at each end carrying the side bearing plates and having a center bearing plate; two elliptical springs carried by the spring plate, one at each side of the truck; a lever located above each spring, each lever having its fulcrum on the bolster near the center of the truck and having a bearing upon the upper section of an elliptical spring and extending beyond the bearing; and a coiled spring mounted between this extension of the lever and the elevated portion of the bolster.

5. The combination in a railway truck, of a frame; transoms extending across the frame and spaced apart; a bolster mounted in the space between the transoms and having a center bearing and elevated side bearings; a spring plate; links by which the spring plate is suspended from the transoms; a set of elliptical springs mounted at each side of the truck and supported by the spring plate; a pivot on the spring plate for each link in line with the center line of said springs; a socket on the under side of the bolster at each side of the center of the truck; a lever having a rounded portion adapted to the socket of the bolster and extending beyond the center of the set of elliptical springs and having a rounded surface bearing upon said springs; and two coiled springs mounted between the lever and the side bearing plates of the bolster.

KENNETH RUSHTON.